United States Patent [19]
Weaver

[11] Patent Number: 5,751,007
[45] Date of Patent: May 12, 1998

[54] METHOD AND APPARATUS FOR GENERATING A PREDETERMINED AMOUNT OF OZONE USING ULTRAVIOLET LIGHT

[76] Inventor: William C. Weaver, 1714 Wood Valley Dr., Carmel, Ind. 46032

[21] Appl. No.: 707,619

[22] Filed: Sep. 5, 1996

[51] Int. Cl.$^6$ .................................................. A61N 5/06
[52] U.S. Cl. .................................. 250/504 R; 250/494.1
[58] Field of Search .......................... 250/504 R, 494.1, 250/493.1; 607/94; 313/487, 488, 489

[56] References Cited

U.S. PATENT DOCUMENTS

| | | | |
|---|---|---|---|
| 3,124,307 | 3/1964 | Hoskins et al. | 240/11.4 |
| 3,798,481 | 3/1974 | Pollara | 313/110 |
| 3,949,258 | 4/1976 | Soodak | 313/25 |
| 4,048,537 | 9/1977 | Blaisdell et al. | 313/489 |
| 4,054,812 | 10/1977 | Lessner et al. | 313/44 |
| 5,143,443 | 9/1992 | Madsen | 362/255 |
| 5,143,445 | 9/1992 | Bateman et al. | 362/293 |
| 5,345,142 | 9/1994 | Chamberlain et al. | 315/58 |
| 5,353,210 | 10/1994 | Strok et al. | 362/293 |
| 5,510,965 | 4/1996 | Teakell | 362/223 |
| 5,557,112 | 9/1996 | Csoknyai et al. | 250/504 R |
| 5,565,685 | 10/1996 | Czako et al. | 250/504 R |

*Primary Examiner*—Kiel T. Nguyen
*Attorney, Agent, or Firm*—Locke Reynolds

[57] ABSTRACT

An apparatus for producing ultraviolet light at wavelengths capable of interacting with atmospheric oxygen to generate a predetermined amount of ozone including a lamp having a tube including a first section capable of emitting UVA light without emitting UVB light and a second section capable of emitting both UVA and UVB light, and a generally tubular sleeve capable of attenuating UVB light mounted to the tube for sliding movement along and covering a selected portion of the second section and attenuating a predetermined amount of UVB light emitted therefrom. An element for fixing the sleeve to the tube at a desired position are provided, and the sleeve may include a plurality of individually slidable sleeve segments. A method for producing ultraviolet light at wavelengths capable of interacting with atmospheric oxygen to generate a predetermined amount of ozone including mounting the sleeve to the tube so that the sleeve is disposed to at least partially surround a portion of the tube and is capable of sliding movement along a portion of the tube, and slidably adjusting the sleeve with respect to the tube to cover a selected portion of the second section and attenuate a predetermined amount of UVB light.

25 Claims, 4 Drawing Sheets

METHOD AND APPARATUS FOR GENERATING A PREDETERMINED AMOUNT OF OZONE USING ULTRAVIOLET LIGHT

BACKGROUND OF THE INVENTION

1. Field of the Invention

The present invention generally relates to the field of methods and apparatus for production of ozone, and particularly concerns methods and apparatus utilizing ultraviolet (UV) lamps producing electromagnetic radiation capable of interacting with atmospheric oxygen to produce ozone. More particularly, this invention relates to ozone generators intended to reduce offensive odors in an enclosure.

2. Description of the Prior Art

For a significant fraction of the year, for most enclosed structures such as houses, office buildings, and the like, it is necessary to either heat or cool the air to provide a comfortable living temperature. Particularly in modern office buildings, where windows cannot be opened, the only supply of fresh air is through a central air handling system. This central handling air system typically includes appropriate mechanisms for recirculating a portion of the building air, while at the same time expelling another portion of the building air. Fresh make-up air from outside the building is ordinarily introduced to ensure a sufficient air supply. In the absence of any make-up air, the recirculated air quickly becomes stale and can accumulate offensive odors. However, since energy is required to heat or cool newly introduced make-up air to the desired building temperature, limiting make-up air increases the energy efficiency of the building.

Many attempts have been made to remove offensive odors and to otherwise make recirculated air within a building more acceptable. Liquids, sprays, and sublimating solids have been employed to introduce odor masking agents into the air. Filters have also been employed including chemically active agents such as activated carbon, potassium permanganate impregnated alumina, and the like.

Particular success has been achieved in eliminating offensive odors from enclosed spaces through the use of ozone generators. Ozone may act to oxidize unpleasant odors in the air while providing the air with a generally fresh spring-like scent. Ozone generators may be included in the original construction of air handling systems, added to existing air handling systems, or used in portable units.

Ozone may be produced by the interaction of ultraviolet light at wavelengths below about 200 nm with atmospheric oxygen. Lamps capable of producing such ultraviolet light have been used in ozone generators in air handling systems. In this regard, while some ozone formation is desirable, the production of too much ozone is not desirable. Thus, there is a need to variably control the amount of ozone generated by ultraviolet lamps in ozone generators.

SUMMARY OF THE INVENTION

In order to aid in the understanding of the present invention, it can be stated in essentially summary form that it is directed to a method and apparatus for producing ultraviolet light capable of interacting with oxygen in the surrounding atmosphere to produce a predetermined amount of ozone.

More specifically, the apparatus of the present invention includes a lamp having a fluorescent-type tube mounted to a base at tube ends, and electrical connectors for connection to a source of electrical power. The tube may be U-shaped, or may be formed to have a straight or other shape. The lamp is capable of emitting ultraviolet light over a wavelength range, both above and below 200 nm. The tube includes generally cylindrical first and second sections, with the first section formed using a glass capable of transmitting ultraviolet light excluding wavelengths below about 200 nm, that is, capable of transmitting longer wavelength, lower energy UVA light, but not capable of transmitting shorter wavelength, higher energy UVB light, and the second section formed using a material such as fused quartz that is capable of transmitting ultraviolet light including wavelengths below about 200 nm, that is, capable of transmitting UVB light as well as UVA light. The first and second sections may be joined together in end-to-end fashion at a fused joint, so that the tube may be formed to be a continuous structure having a substantially smooth exterior surface. The first section emits ultraviolet light at wavelengths greater than about 200 nm (UVA) that is capable of killing bacteria and microbes. The second section emits ultraviolet light of wavelengths less than about 200 nm (UVB) capable of interacting with atmospheric $O_2$ to produce ozone, as well as UVA light capable of killing bacteria and microbes. The tube may include indicia for indicating relative placement of a sleeve with respect to the tube.

A generally tubular sleeve is formed of a material that is capable of attenuating or blocking ultraviolet light of wavelengths below about 200 nm, such as polycarbonate or metal, and is mounted at least partially surrounding a portion of the tube for slidable movement generally coaxially along a portion of the tube. The sleeve may cover a selected portion of the second section and attenuate a predetermined amount of ultraviolet light of wavelengths below about 200 nm emitted from the second section.

The sleeve may be fixed at a desired position with respect to the tube using a plurality of frictional inwardly projecting members, such as flexible protrusions or spring elements. The projecting members are disposed at an interior surface of the sleeve and bear against an exterior surface of the tube, thereby by establishing frictional contact between the sleeve and the tube.

In use, the apparatus of the present invention is attached to a supply of electrical power at the connectors, whereby the lamp produces ultraviolet light both above and below 200 nm. By mounting the sleeve to the tube so that the sleeve is capable of longitudinal sliding movement generally coaxially along a portion of the tube, and adjusting the sleeve with respect to the tube to cover a selected portion of the second section, a predetermined amount of ultraviolet light of wavelengths below about 200 nm emitted from the second section is attenuated or blocked and the amount of ozone created by the lamp is variably controlled. In other words, the sleeve may be slid along the tube to vary transmission to the atmosphere of UVB light emitted from the second section.

If the amount of ozone produced as a result of UVB light emitted from the second section is greater than desired, the sleeve may be slid along the tube so that an additional portion of the second section is covered by the sleeve. In this way, less UVB light is transmitted to the atmosphere surrounding the lamp so that less ozone is produced. On the other hand, if the amount of ozone produced as a result of UVB light emitted from the second section is less than desired, the sleeve may be slid along the tube so that an additional portion of the second section is uncovered, whereby a greater amount of UVB light is transmitted to the atmosphere surrounding the lamp, producing a greater amount of ozone.

At each position of the sleeve relative to the tube, the sleeve is held in position against unwanted relative movement which may occur due to vibration or gravity by frictional contact of the frictional members between the sleeve and the tube. Moreover, adjustment of the relative position of the sleeve with respect to the tube may be facilitated using the indicia, where the relative position of the sleeve may be noted by observing the location of the sleeve end with respect to the indicia. If the sleeve is mounted to the tube at the time of manufacture of the lamp, the sleeve can completely surround a portion of the tube, with the projecting members providing frictional contact between the sleeve and the tube so that the sleeve may be maintained at a desired location on the tube.

In a second embodiment of the apparatus of the present invention, the sleeve may be formed of a flexible, resilient material and define a longitudinal slit, so that the sleeve may take the form of a split sleeve that may be mounted to the tube after the lamp has been completely constructed. By forming the sleeve to define an interior diameter that is slightly less that an exterior diameter defined by the tube, the sleeve may be disposed to substantially surround the tube with frictional contact between the exterior surface of the tube and the interior surface of the sleeve. In this way, the sleeve may be slid longitudinally along the tube, while being held in place at any desired location with respect to the tube as a result of the flexible, resilient construction of the sleeve.

In a third embodiment of the apparatus of the present invention, the sleeve may be formed of a flexible, resilient material and define a longitudinal slit, the sleeve thereby taking the form of a split sleeve that may be mounted to the tube after the lamp has been completely constructed. A pair of generally opposing biasing members, having handle portions, are mounted to the sleeve and provide pincers-like frictional contact between the interior surface of the sleeve and the exterior surface of the tube. By pinching together the handle portions against the force of the biasing members, frictional contact between the tube and the sleeve may be decreased, so that the sleeve may be longitudinally slid along the tube to a desired location.

In a fourth embodiment of the present invention, the sleeve may be formed including a plurality of generally tubular sleeve segments, each sleeve segment having segment ends and capable of attenuating or blocking transmission of ultraviolet light at wavelengths below about 200 nm. The sleeve segments may be mounted to the tube so that at least one sleeve segment is capable of sliding movement longitudinally along a portion of the tube, and may cover a selected portion of the second section in order to permit attenuation of ultraviolet light of wavelengths below about 200 nm emitted from the second section. Each sleeve segment may be fixed at a desired position on the tube using the frictional members disposed, for example, at the segment ends, or using the biasing members, or by forming the sleeve segments to have a slit.

In a fifth embodiment of the apparatus of the present invention, a generally C-shaped tubular first sleeve, capable of attenuating UVB light, is mounted proximate to and at least partially surrounding a portion of a tube capable of emitting UVB light, and is capable of relative rotation with respect to the tube about a longitudinal axis of the tube. The first sleeve may therefore cover a selected portion of the tube and attenuate a predetermined amount of UVB light emitted from the tube. A generally C-shaped tubular second sleeve, also capable of attenuating UVB light, is mounted proximate to and at least partially surrounding a portion of the first sleeve and of the tube, and is capable of relative rotation with respect to the tube and the first sleeve about the longitudinal axis defined by the tube. The second sleeve may thus attenuate a predetermined amount of UVB light emitted from the tube, in addition to the UVB light attenuated by the first sleeve. By rotation of the first and second sleeves with respect to the tube and with respect to each other, the width of a longitudinal gap defined between the first and second sleeves and proximate to the tube may be varied. With changes in the width of the gap, the amount of UVB light emitted by the tube that is attenuated by the first and second sleeves is consequently changed.

By forming the first sleeve of a flexible, resilient material, and by selecting the interior diameter of the first sleeve to be slightly less than an exterior diameter defined by the tube, the first sleeve may be disposed in partially surrounding frictional contact with the exterior surface of the tube. As a result, the first sleeve may be held in place at any desired location with respect to the tube as a result of the flexible, resilient construction of the first sleeve, yet may be rotated with respect to the tube as desired, to a selected position. Similarly, by forming the second sleeve of a flexible, resilient material, and by selecting the interior diameter of the second sleeve to be slightly less than the exterior diameter defined by the first sleeve when mounted partially surrounding the tube, a second sleeve interior surface may be disposed in partially surrounding frictional contact with an exterior surface of the first sleeve. In this way, the second sleeve may be held in place at any desired location with respect to the tube due to the flexible, resilient construction of the second sleeve, yet may be rotated as desired with respect to the tube and the first sleeve. Additional sleeves may be mounted to the tube for rotational movement, and the sleeves may also be mounted for sliding movement longitudinally along the tube, as well as for rotational movement with respect to the longitudinal axis of the tube.

DESCRIPTION OF THE PREFERRED EMBODIMENTS

Figure 1:
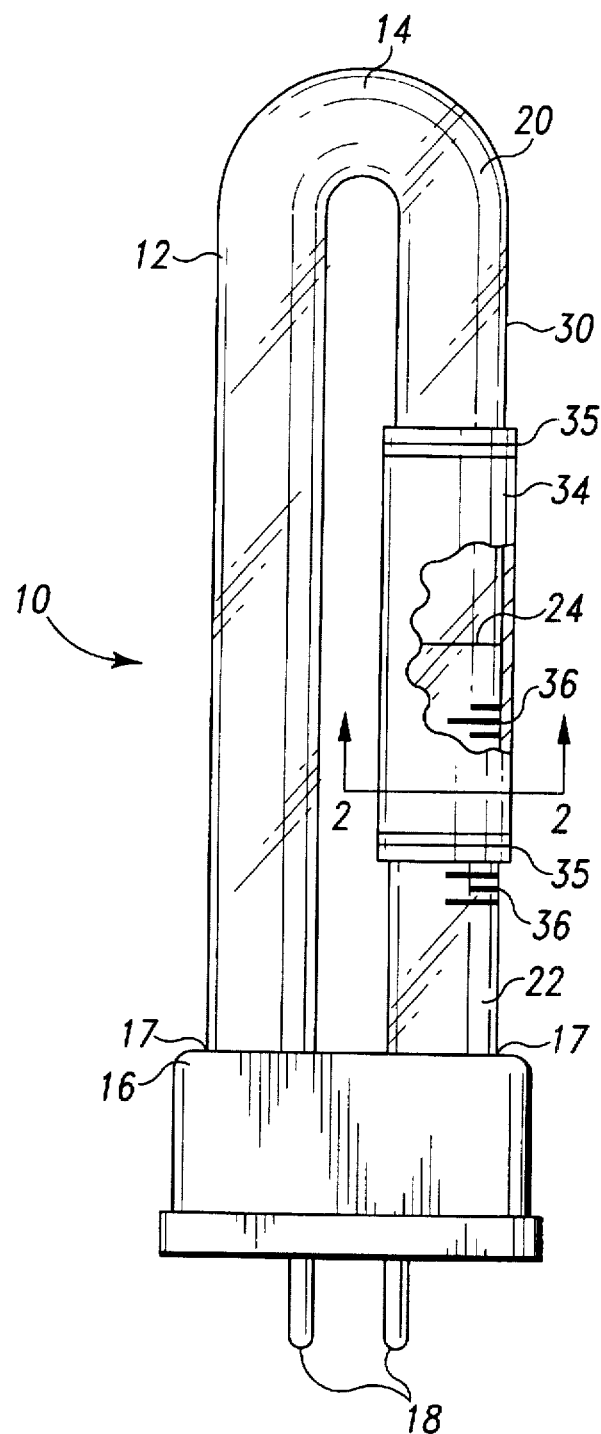
FIG. 1 is an elevational view of a device for producing a predetermined amount of ultraviolet light representing the present invention, with the sleeve depicted as partially cut away.

The following portion of the specification, taken in conjunction with the drawings, sets forth the preferred embodiments of the present invention. The embodiments of the invention disclosed herein are the best mode contemplated for carrying out this invention in a commercial environment, although it should be recognized and understood that various modifications can be accomplished within the parameters of the present invention.

Referring now to the drawings for a detailed description of a first embodiment of the apparatus of the present invention, reference is first made to FIG. 1 generally depicting apparatus 10 capable of producing a predetermined amount of ultraviolet light at wavelengths below about 200 nm. Lamp 12 has generally U-shaped fluorescent-type tube 14 mounted to base 16 at tube ends 17 and electrical connectors 18 for connection to a source of electrical power, not shown. While tube 14 may be U-shaped as illustrated, such a U-shape is not necessary to the invention, so that lamp 12 may be formed to have a straight or other shape tube 14. Lamp 12 is capable of emitting ultraviolet light over a wavelength range both above and below 200 nm.

As is well known in the art of ultraviolet-producing lamps, tube 14 may include generally cylindrical first section 20 and second section 22, with first section 20 formed using a glass capable of transmitting ultraviolet light excluding wavelengths below about 200 nm, that is, capable of transmitting longer wavelength, lower energy UVA light, but not capable of transmitting shorter wavelength, higher energy UVB light, and second section 22 formed using a material such as fused quartz that is capable of transmitting ultraviolet light including wavelengths below about 200 nm, that is, capable of transmitting UVB light as well as UVA light. First and second sections 20 and 22 may be joined together in end-to-end fashion at fused joint 24, so that tube 14 may be formed to be a continuous structure having a substantially smooth exterior surface 30. First section 20 of lamp 12, formed using a type of glass that permits transmission of UVA light, emits ultraviolet light at wavelengths greater than about 200 nm (UVA) that is capable of killing bacteria and microbes. Second section 22 of lamp 12, formed using fused quartz of a character that permits transmission of ultraviolet light of wavelengths less than about 200 nm (UVB) as well as UVB light, emits ultraviolet light that is capable of interacting with atmospheric $O_2$ to produce ozone, in addition to killing bacteria and microbes. Tube 14 may include indicia 36 for indicating relative placement of a sleeve 34 with respect to tube 14, as will be described.

Figure 2:
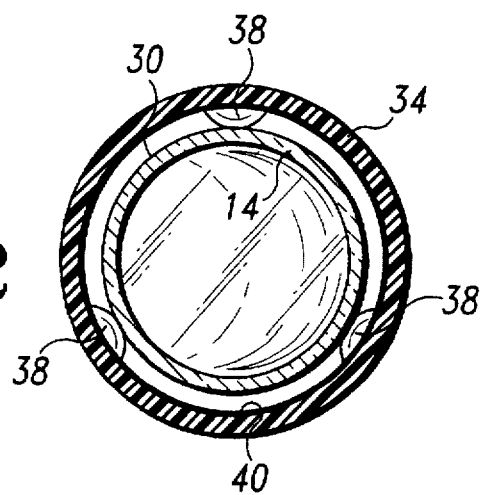
FIG. 2 is an enlarged sectional view of a portion of a device for producing a predetermined amount of ultraviolet light representing the present invention, taken along line 2—2 of FIG. 1.

Referring to FIGS. 1–2, generally tubular sleeve 34 is formed of a material that is capable of blocking or attenuating ultraviolet light of wavelengths below about 200 nm, such as polycarbonate or metal, and is mounted at least partially surrounding portion of tube 14 for slidable longitudinal movement generally coaxially along a portion of tube 14. Sleeve 34 may cover a selected portion of second section 22 and attenuate a predetermined amount of ultraviolet light of wavelengths below about 200 nm emitted from second section 22.

As depicted in FIG. 2, sleeve 34 may be fixed at a desired position with respect to tube 14 using a plurality of frictional inwardly projecting members 38, such as flexible protrusions or spring elements. Projecting members 38 are disposed at interior surface 40 of sleeve 34, for instance proximate to sleeve ends 35, and bear against exterior surface 30 of tube 14, thereby by establishing frictional contact between sleeve 34 and tube 14.

In use, apparatus 10 is attached to a supply of electrical power at connectors 18, whereby lamp 12 produces ultraviolet light both above and below 200 nm. By mounting sleeve 34 to tube 14 so that sleeve 34 is capable of longitudinal sliding movement generally coaxially along a portion of tube 14, and adjusting sleeve 34 with respect to tube 14 to cover a selected portion of second section 22, a predetermined amount of ultraviolet light of wavelengths below about 200 nm emitted from second section 22 is attenuated or blocked and the amount of ozone created by lamp 10 may be variably controlled. In other words, sleeve 34 may be slid along tube 14 to vary transmission to the atmosphere of UVB light emitted from second section 22 of tube 14.

In the event that the amount of ozone produced as a result of UVB light emitted from second section 22 is greater than desired, sleeve 34 may be slid along tube 14 so that an additional portion of second section 22 is covered by sleeve 34. In this way, less UVB light is transmitted to the atmosphere surrounding lamp 12 so that less ozone is produced. On the other hand, in the event that the amount of ozone produced as a result of UVB light emitted from second section 22 is less than desired, sleeve 34 may be slid along tube 14 so that an additional portion of second section 22 is uncovered, whereby a greater amount of UVB light is transmitted to the atmosphere surrounding lamp 12, producing a greater amount of ozone. At each position of sleeve 34 relative to tube 14, sleeve 34 is held in position against unwanted relative movement which may occur due to vibration or gravity by frictional contact of frictional members 38 between sleeve 34 and tube 14. Moreover, adjustment of the relative position of sleeve 34 with respect to tube 14 may be facilitated using indicia 36 present on tube 14, where the relative position of sleeve 34 may be noted by observing the location of sleeve end 35 with respect to indicia 36. It will be appreciated that if sleeve 34 is mounted to tube 14 at the time of manufacture of lamp 12, sleeve 34 can completely surround a portion of tube 14, with projecting members 38 providing frictional contact between sleeve 34 and tube 14 so that sleeve 34 may maintained at a desired location on tube 14.

Figure 3:
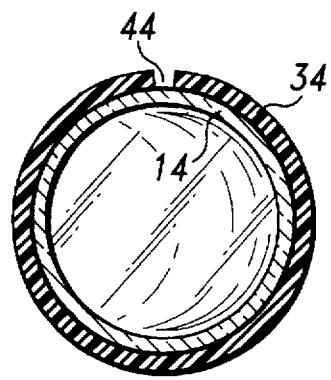
FIG. 3 is an enlarged sectional view of a portion of a device for producing a predetermined amount of ultraviolet light representing the present invention, taken along line 2—2 of FIG. 1, but representing a second embodiment of the present invention.
Figure 4:
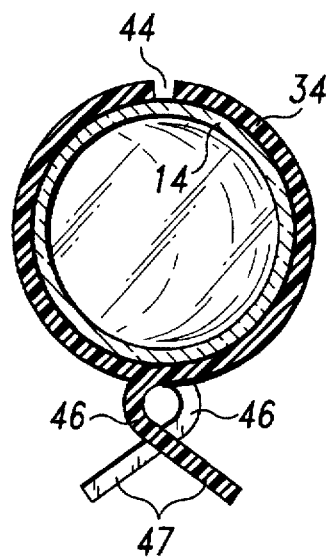
FIG. 4 is an enlarged sectional view of a portion of a device for producing a predetermined amount of ultraviolet light representing the present invention, taken along line 2—2 of FIG. 1, but representing a third embodiment of the present invention.

In a second embodiment of the apparatus of the present invention, as depicted in FIG. 3, sleeve 34 may be formed of a flexible, resilient material and define longitudinal slit 44, so that sleeve 34 may take the form of a split sleeve that may be mounted to tube 14 after lamp 12 has been completely constructed. By forming sleeve 34 to define an interior diameter that is slightly less that an exterior diameter defined by tube 14, sleeve 34 may be disposed to substantially surround tube 14 with frictional contact between exterior surface 30 of tube 14 and interior surface 40 of sleeve 34. In this way, sleeve 34 may be slid longitudinally along tube 14, while being held in place at any desired location with respect to tube 14 as a result of the flexible, resilient construction of sleeve 34. As described, with sleeve 34 disposed to cover a portion of second section 22, the amount of UVB light transmitted into surrounding oxygen may be controlled and the amount of ozone produced by the present invention may thus be regulated. FIG. 4 depicts a third embodiment of the apparatus of the present invention, where sleeve 34 may be formed of a flexible, resilient material and define longitudinal slit 44, sleeve 34 thereby taking the form of a split sleeve that may be mounted to tube 14 after lamp 12 has been completely constructed. A pair of generally opposing biasing members 46, having handle portions 47, are mounted to sleeve 34 and provide pincers-like frictional contact between interior surface 40 of sleeve 34 and exterior surface 30 of tube 14. By pinching together handle portions 47 against the force of biasing members 46, frictional contact between tube 14 and sleeve 34 may be decreased, so that sleeve 34 may be longitudinally slid along tube 14 to a desired location.

Figure 5:
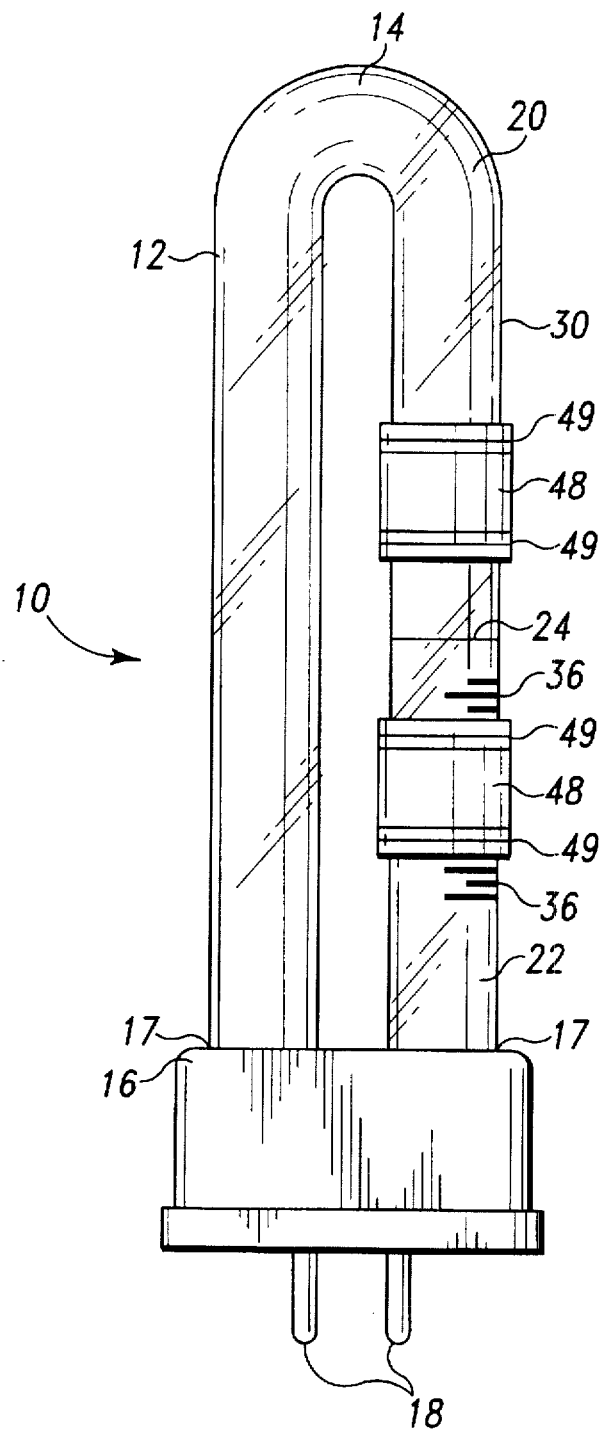
FIG. 5 is an elevational view of a fourth embodiment of a device for producing a predetermined amount of ultraviolet light representing the present invention.

Referring to FIG. 5, in a fourth embodiment of the apparatus of the present invention, sleeve 34 may be formed including a plurality of generally tubular sleeve segments 48, each sleeve segment 48 having segment ends 49 and capable of blocking or attenuating transmission of ultraviolet light at wavelengths below about 200 nm. Although two sleeve segments 48 at illustrated in FIG. 5, it will be recognized that three or more sleeve segments 48 may be utilized within the purview of the present invention. Sleeve segments 48 may be mounted to tube 14 so that at least one sleeve segment 48 is capable of sliding movement longitudinally along a portion of tube 14 and may cover a selected portion of second section 22, in order to permit attenuation of ultraviolet light of wavelengths below about 200 nm emitted from second section 22. Of course, more than one sleeve segment 48 may be slidably mounted to tube 14 in a similar manner. Each slidably movable sleeve segment 48 may be fixed at a desired position on tube 14 using frictional members 38 disposed, for example, at segment ends 49, or using biasing members 46, or by forming sleeve segments 48 to have a slit 44 as previously described.

One characteristic of ultraviolet emitting lamps is that the intensity of emitted ultraviolet light decreases with increasing distance from tube ends 17 measured along tube 14. Consequently, sleeve segment 48 disposed at second section 22 shown in FIG. 5 would block relatively less UVB light in the event that it is slid away from tube end 17 and towards first section 20, and would block relatively more UVB light in the event that it is slid towards tube end 17 and away from first section 20. By positioning sleeve segments 48 at various locations along tube 14, at first section 20, second section 22, and/or proximate to fused joint 24, a predetermined amount of UVB light may be transmitted to the atmosphere surrounding lamp 12, in order to produce a desired amount of ozone.

Figure 6:
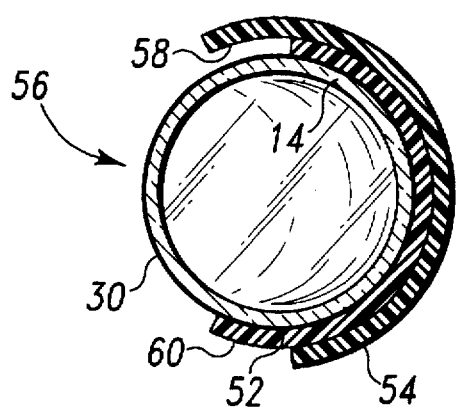
FIG. 6 is an enlarged sectional view of a portion of a device for producing a predetermined amount of ultraviolet light representing the present invention, taken along line 2—2 of FIG. 1, but representing a fifth embodiment of the present invention.

In a fifth embodiment of the apparatus of the present invention illustrated in FIG. 6, generally C-shaped tubular first sleeve 52, capable of attenuating ultraviolet light at wavelengths below about 200 nm, is mounted proximate to and at least partially surrounding a portion of tube 14 capable of emitting UVB light, and is capable of relative rotation with respect to tube 14 about a longitudinal axis defined by tube 14. As a result, first sleeve 52 may cover a selected portion of tube 14 and attenuate a predetermined amount of ultraviolet light of wavelengths below about 200 nm emitted from tube 14. Generally C-shaped tubular second sleeve 54, also capable of attenuating ultraviolet light at wavelengths below about 200 nm, is mounted proximate to and at least partially surrounding a portion of first sleeve 52 and of tube 14, and is capable of relative rotation with respect to tube 14 and first sleeve 52 about the longitudinal axis defined by tube 14. Consequently, second sleeve 54 may attenuate a predetermined amount of UVB light emitted from tube 14, in addition to the UVB light attenuated by first sleeve 52. By rotation of first and second sleeves 52 and 54 with respect to tube 14 and with respect to each other, the width of longitudinal gap 56 defined between first and second sleeves 52 and 54 may be varied. With changes in the width of gap 56, the amount of UVB light emitted by tube 14 that is attenuated by first and second sleeves 52 and 54 is changed, that is, as gap 56 is reduced in width, more emitted ultraviolet light is attenuated as a greater portion of tube 14 is effectively covered by first and second sleeves 52 and 54, and vice-versa.

By forming first sleeve 52 of a flexible, resilient material, and by selecting the interior diameter of first sleeve 52 to be slightly less than the exterior diameter defined by tube 14, first sleeve 52 may be disposed in partially surrounding frictional contact with exterior surface 30 of tube 14. As a result, first sleeve 52 may be held in place at any desired location with respect to tube 14 as a result of the flexible, resilient construction of first sleeve 52, yet may be rotated with respect to tube 14 as desired, to a selected position. Similarly, by forming second sleeve 54 of a flexible, resilient material, and by selecting the interior diameter of second sleeve 54 to be slightly less than the exterior diameter defined by first sleeve 52 when mounted partially surrounding tube 14, second sleeve interior surface 58 may be disposed in partially surrounding frictional contact with first sleeve exterior surface 60. In this way, second sleeve 54 may be held in place at any desired location with respect to tube 14 due to the flexible, resilient construction of second sleeve 54, yet may be rotated as desired with respect to tube 14 and first sleeve 52.

It will be recognized the preceding description of utilization of first and second sleeves 52 and 54 is exemplary only, and that, within the contemplation of the present invention, additional sleeves may, of course, be mounted to tube 14 for rotational movement. Further, the sleeves may also be mounted for sliding movement longitudinally along tube 14, as previously described, in addition to rotational movement with respect to the longitudinal axis of tube 14.

The present invention having been described in its preferred embodiments, it is clear that the present invention is susceptible to numerous modifications and embodiments within the ability of those skilled in the art and without the exercise of the inventive faculty. Accordingly, the scope of the present invention is defined as set forth by the scope of the following claims.

What is claimed is:

1. An ultraviolet light attenuating device for a lamp having a tube including a first section emitting ultraviolet light excluding wavelengths below about 200 nm and a second section emitting ultraviolet light including wavelengths below about 200 nm, comprising:

a generally tubular sleeve attenuating ultraviolet light at wavelengths below about 200 nm; and mounting means for mounting the sleeve to the tube so that the sleeve is disposed to at least partially surround a portion of the tube and is slidable along a portion of the tube, and covers a selected portion of the second section and attenuates a predetermined amount of ultraviolet light at wavelengths below about 200 nm emitted from the second section.

2. An ultraviolet light attenuating device as recited in claim 1, wherein the mounting means includes means for fixing the sleeve to the tube at a desired position.

3. An ultraviolet light attenuating device as recited in claim 2, wherein the means for fixing the sleeve to the tube includes at least one projecting member disposed between the sleeve and the tube and providing frictional force therebetween.

4. An ultraviolet light attenuating device as recited in claim 2, wherein the sleeve is formed of a flexible, resilient material, defines a longitudinal slit, and defines an interior diameter slightly less than an exterior diameter defined by the tube.

5. An ultraviolet light attenuating device as recited in claim 4, wherein the means for fixing the sleeve to the tube includes at least one biasing member attached to the sleeve and providing frictional contact between the sleeve and the tube.

6. An ultraviolet light attenuating device for a lamp having a tube including a section emitting ultraviolet light including wavelengths below about 200 nm, comprising:

a plurality of generally tubular sleeve segments attenuating ultraviolet light at wavelengths below about 200 nm; and mounting means for mounting the sleeve segments to the tube so that at least one of the sleeve segments is disposed to at least partially surround a portion of the tube and is slidable along a portion of the tube, and covers a selected portion of the section and attenuates a predetermined amount of ultraviolet light of wavelengths below about 200 nm emitted from the section.

7. An ultraviolet light attenuating device as recited in claim 6 wherein the mounting means includes means for fixing at least one of the sleeve segments to the tube at a desired position.

8. An ultraviolet light attenuating device as recited in claim 7, wherein the means for fixing at least one of the sleeve segments to the tube includes at least one projecting member disposed between at least one of the sleeve segments and the tube and providing frictional force therebetween.

9. An ultraviolet light attenuating device as recited in claim 7, wherein at least one of the sleeve segments is formed of a flexible, resilient material, defines a longitudinal slit, and defines an interior diameter slightly less than an exterior diameter defined by the tube.

10. An ultraviolet light attenuating device as recited in claim 9, wherein the means for fixing at least one of the sleeve segments to the tube includes at least one biasing member attached to at least one of the sleeve segments and providing frictional contact between at least one of the sleeve segments and the tube.

11. A device for producing a predetermined amount of ultraviolet light at wavelengths below about 200 nm, comprising:

a lamp having tube including a first section emitting ultraviolet light excluding wavelengths below about 200 nm and a second section emitting ultraviolet light including wavelengths below about 200 nm;

a generally tubular sleeve attenuating ultraviolet light of wavelengths below about 200 nm; and mounting means for mounting the sleeve to the tube so that the sleeve is disposed to at least partially surround a portion of the tube and is slidable along a portion of the tube, and covers a selected portion of the second section and attenuates a predetermined amount of ultraviolet light of wavelengths below about 200 nm emitted from the second section.

12. A device for producing a predetermined amount of ultraviolet light at wavelengths below about 200 nm as recited in claim 11 wherein the mounting means includes means for fixing the sleeve to the tube at a desired position.

13. A device for producing a predetermined amount of ultraviolet light at wavelengths below about 200 nm as recited in claim 12, wherein the means for fixing the sleeve to the tube includes at least one projecting member disposed between the sleeve and the tube and providing frictional force therebetween.

14. A device for producing a predetermined amount of ultraviolet light at wavelengths below about 200 nm as recited in claim 12, wherein the sleeve is formed of a flexible, resilient material, defines a longitudinal slit, and defines an interior diameter slightly less than an exterior diameter defined by the tube.

15. A device for producing a predetermined amount of ultraviolet light at wavelengths below about 200 nm as recited in claim 14, wherein the means for fixing the sleeve to the tube includes at least one biasing member attached to the sleeve and providing frictional contact between the sleeve and the tube.

16. A device for producing a predetermined amount of ultraviolet light at wavelengths below about 200 nm as recited in claim 12, wherein the tube includes indicia for indicating relative placement of the sleeve with respect to the tube.

17. An ultraviolet light attenuating device for a lamp having a tube including a section defining a longitudinal axis and emitting ultraviolet light including wavelengths below about 200 nm, comprising:

a generally C-shaped tubular first sleeve attenuating ultraviolet light at wavelengths below about 200 nm and being mounted proximate to and at least partially surrounding a portion of the section for rotation about the longitudinal axis, whereby the first sleeve covers a selected portion of the section and attenuates a predetermined amount of ultraviolet light of wavelengths below about 200 nm emitted from the section; and a generally C-shaped tubular second sleeve attenuating ultraviolet light at wavelengths below about 200 nm and being mounted proximate to and at least partially surrounding a portion of the first sleeve and the section for rotation about the longitudinal axis, whereby the second sleeve attenuates a predetermined amount of ultraviolet light of wavelengths below about 200 nm emitted from the section.

18. An ultraviolet light attenuating device as recited in claim 17 wherein:

the first sleeve is formed of a flexible, resilient material and defines an interior diameter slightly less than an exterior diameter defined by the section, whereby the first sleeve is fixed to the section at a desired position; and the second sleeve is formed of a flexible, resilient material and defines an interior diameter slightly less than an exterior diameter defined by the first sleeve when mounted to the section, whereby the second sleeve is fixed to the section and the first sleeve at a desired position.

19. An ultraviolet light attenuating device as recited in claim 17 wherein at least one of the sleeves is slidable longitudinally along the section.

20. A method for producing a predetermined amount of ultraviolet light at wavelengths below about 200 nm, comprising:

mounting a generally tubular sleeve attenuating ultraviolet light at wavelengths below about 200 nm to a tube of a lamp so that the sleeve is disposed to at least partially surround a portion of the tube and is slidable along a portion of the tube, the tube having a first section emitting ultraviolet light excluding wavelengths below about 200 nm and a second section emitting ultraviolet light including wavelengths below about 200 nm; and slidably adjusting the sleeve with respect to the tube to cover a selected portion of the second section and attenuate a predetermined amount of ultraviolet light of wavelengths below about 200 nm emitted from the second section.

21. A method for producing a predetermined amount of ultraviolet light at wavelengths below about 200 nm as recited in claim 20 further comprising fixing the sleeve to the tube at a desired position.

22. A method for producing a predetermined amount of ultraviolet light at wavelengths below about 200 nm, comprising:

mounting a plurality of generally tubular sleeve segments attenuating ultraviolet light at wavelengths below about 200 nm to a tube of a lamp so that at least one of the sleeve segments is disposed to at least partially surround a portion of the tube and is slidable along a portion of the tube, the tube having a section emitting ultraviolet light including wavelengths below about 200 nm; and slidably adjusting at least one of the sleeve segments with respect to the tube to cover a selected portion of the section and attenuate a predetermined amount of ultraviolet light of wavelengths below about 200 nm emitted from the section.

23. A method for producing a predetermined amount of ultraviolet light at wavelengths below about 200 nm as recited in claim 22 further comprising fixing at least one of the sleeve segments to the tube at a desired position.

24. A method for producing a predetermined amount of ultraviolet light at wavelengths below about 200 nm, comprising:

mounting a first generally C-shaped tubular sleeve attenuating ultraviolet light at wavelengths below about 200 nm to a section of a tube of a lamp, the section defining a longitudinal axis and emitting ultraviolet light including wavelengths below about 200 nm, so that the first sleeve is disposed proximate to and at least partially surrounding a portion of the section and is rotation about the longitudinal axis;

mounting a second generally C-shaped tubular sleeve attenuating ultraviolet light at wavelengths below about 200 nm proximate to and at least partially surrounding the first sleeve and the section, so that the second sleeve is rotation about the longitudinal axis; and rotating at least one of the sleeves with respect to the section to cover a selected portion of the section and attenuate a predetermined amount of ultraviolet light of wavelengths below about 200 nm emitted from the section.

25. A method for producing a predetermined amount of ultraviolet light at wavelengths below about 200 nm as recited in claim 24 further comprising fixing at least one of the sleeves to the section at a desired position.

* * * * *